United States Patent
Heinisch et al.

(10) Patent No.: US 11,601,688 B2
(45) Date of Patent: Mar. 7, 2023

(54) AUTOMATED SELF-TEST OF CABIN LOUDSPEAKERS

(71) Applicant: Airbus Operations GmbH, Hamburg (DE)

(72) Inventors: Matthias Heinisch, Hamburg (DE); Peter Klose, Hamburg (DE); Fabien Geyer, Unterschleissheim (DE)

(73) Assignee: Airbus Operations GmbH, Hamburg (DE)

( * ) Notice: Subject to any disclaimer, the term of this patent is extended or adjusted under 35 U.S.C. 154(b) by 858 days.

(21) Appl. No.: 16/551,886

(22) Filed: Aug. 27, 2019

(65) Prior Publication Data
US 2020/0070980 A1 Mar. 5, 2020

(30) Foreign Application Priority Data
Aug. 29, 2018 (DE) ...................... 10 2018 121 123.6

(51) Int. Cl.
*H04N 21/214* (2011.01)
*B64D 11/00* (2006.01)
(Continued)

(52) U.S. Cl.
CPC ..... *H04N 21/2146* (2013.01); *B64D 11/0015* (2013.01); *B64F 5/60* (2017.01);
(Continued)

(58) Field of Classification Search
None
See application file for complete search history.

(56) References Cited

U.S. PATENT DOCUMENTS

| 3,795,771 A | 3/1974 | Gundersen et al. |
| 6,393,343 B1 | 5/2002 | Frey et al. |

(Continued)

FOREIGN PATENT DOCUMENTS

| CN | 1984171 A | 6/2007 |
| CN | 101089641 A | 12/2007 |

(Continued)

OTHER PUBLICATIONS

IEEE Xplore Digital Library, "IEEE Standard for a Precision Clock Synchronization Protocol for Networked Measurement and Control Systems" Published Jul. 24, 2008.
(Continued)

*Primary Examiner* — Ricky Chin
(74) *Attorney, Agent, or Firm* — Greer, Burns & Crain, Ltd.

(57) ABSTRACT

A test module for functionally testing an audio device of an aircraft passenger service unit (PSU) is configured to allocate a first operating mode to a first individual audio device of one PSU of a set of PSUs during which, a test tone is emitted. The test module allocates a second operating mode to other audio devices different than the first audio device. In the second operating mode, the test tone emitted by the first audio device is intended to be received. The other audio devices each belong to different PSUs within the set of PSUs. The test module emits the test tone via the first audio device. The test module initiates a functional test of the first audio device. The functional test is based on the test tone received by the other audio devices. The test module may be part of a system and an aircraft.

12 Claims, 2 Drawing Sheets

(51) Int. Cl.
   *H04R 29/00* (2006.01)
   *B64F 5/60* (2017.01)
   *H04L 67/12* (2022.01)
   *H04L 9/40* (2022.01)

(52) U.S. Cl.
   CPC ............... *H04L 9/40* (2022.05); *H04L 67/12* (2013.01); *H04R 29/001* (2013.01)

(56) References Cited

U.S. PATENT DOCUMENTS

| | | | |
|---|---|---|---|
| 7,114,171 B2 * | 9/2006 | Brady, Jr. ............... | H04N 7/181 348/E7.086 |
| 8,706,278 B2 * | 4/2014 | Kirsch ............... | G01R 31/2825 381/86 |
| 9,436,568 B2 * | 9/2016 | Lee ....................... | G06F 11/273 |
| 2012/0310585 A1 * | 12/2012 | Oliveira ................... | B64F 5/60 702/119 |
| 2013/0211663 A1 * | 8/2013 | Kirsch ............... | G01R 31/2825 701/32.7 |
| 2014/0003194 A1 * | 1/2014 | Klose ................. | B64D 11/0015 367/118 |
| 2015/0355988 A1 * | 12/2015 | Lee ....................... | G06F 13/385 714/27 |
| 2020/0070980 A1 * | 3/2020 | Heinisch ............. | H04N 21/233 |

FOREIGN PATENT DOCUMENTS

| | | | | |
|---|---|---|---|---|
| CN | 103257310 A | | 8/2013 | |
| CN | 103733648 A | * | 4/2014 | ............. H03G 5/165 |
| CN | 107071681 A | * | 8/2017 | ............. G06F 3/165 |
| CN | 207099093 U | | 3/2018 | |
| DE | 102006006720 A1 | | 8/2007 | |
| EP | 1504604 B1 | | 12/2012 | |
| WO | 0052550 A2 | | 9/2000 | |
| WO | WO-2013106366 A1 | * | 7/2013 | ............. G06F 3/165 |
| WO | WO-2016071221 A1 | * | 5/2016 | ............. H04M 1/24 |

OTHER PUBLICATIONS

German Search Report; priority document.

* cited by examiner

AUTOMATED SELF-TEST OF CABIN LOUDSPEAKERS

CROSS-REFERENCES TO RELATED APPLICATIONS

This application claims the benefit of the German patent application No. 10 2018 121 123.6 filed on Aug. 29, 2018, the entire disclosures of which are incorporated herein by way of reference.

FIELD OF THE INVENTION

Examples relate to concepts for functionally testing an audio device of a passenger service unit (PSU) in an aircraft and applications relating to this and, in particular, to a test module for functionally testing an audio device of a PSU in an aircraft, to a system for functionally testing an audio device of a PSU in an aircraft, and to a method for functionally testing an audio device of a PSU in an aircraft by means of a test module.

BACKGROUND OF THE INVENTION

Audio devices of PSUs in aircraft are normally tested manually. This testing takes a long time. Concepts for this must possibly be optimized with regard to a time saving. Nevertheless, it is desirable to manufacture aircraft more quickly.

SUMMARY OF THE INVENTION

There may therefore be a need to provide concepts for making aircraft construction more efficient.

Such a need may be met by the subject matter of the claims.

A first aspect provides a test module for functionally testing an audio device of a passenger service unit (PSU) in an aircraft. The test module is designed to allocate a first operating mode to an individual audio device. In the first operating mode, a test tone may or is intended to be emitted. The individual audio device belongs to one PSU from a set of PSUs. For example, the audio device may be fitted to or integrated in the PSU. The test module is also designed to allocate a second operating mode to audio devices which differ from the individual audio device. In the second operating mode, the test tone (which is emitted by the individual audio device) may or is intended to be received. The audio devices which differ from the individual audio device each belong to different PSUs from the set of PSUs. For example, the audio devices may be fitted to or integrated in the respective PSU from the set of PSUs. The test module is also designed to cause emission of the test tone via the audio device which is in the first operating mode or to which the first operating mode is allocated. The test module is designed to initiate a functional test of the audio device, which is in the first operating mode or to which the first operating mode is allocated. The functional test is based on the test tone received by the audio devices which are in the second operating mode or to which the second operating mode is allocated.

The test module can be operated by a person/worker intended to check the correct function of the PSUs. Consequently, the workload of the worker can be reduced by using the test module. The test module can also be understood as meaning a test manager or a test apparatus or an apparatus for carrying out tests. The test module may operate autonomously, that is to say, without human assistance. The load on a worker can therefore be relieved since the worker does not have to spend any time on carrying out measurements for each PSU himself. Aircraft construction can therefore be made more efficient.

For example, each PSU in the set of PSUs may have only one audio device. This audio device can also assume or be allocated only two operating modes, the first or the second operating mode. For example, both operating modes cannot be simultaneously allocated to this audio device (or to all audio devices).

The initiation of the functional test may also be performance of the functional test. In this case, the signal processing can be carried out in the test module. Furthermore, the test module may send the command to carry out the signal processing to a further module.

The test module may be designed, in each step in a predetermined sequence of steps, to (iteratively) allocate the first operating mode to an individual audio device belonging to a respective PSU (a different PSU in each step) from the set of PSUs and to simultaneously allocate the second operating mode to all other audio devices of respective other PSUs from the set of PSUs. The test module may also be designed, in each step in the predetermined sequence of steps, to initiate emission of the test tone by the individual audio device to which the first operating mode is allocated. The test module may also be designed, in each step in the predetermined sequence of steps, to initiate a functional test of the individual audio device (which is in the first operating mode) on the basis of the test tone received by all other audio devices.

All other audio devices may differ from the individual audio device in each step. The allocation of the first operating mode to the individual audio device and the allocation of the second operating mode to the other audio devices may change according to the predetermined sequence. The first operating mode may be allocated to a first audio device in a first step in the predetermined sequence. The second operating mode can then be respectively allocated to a first, second, third, . . . nth audio device in the first step (in the case of a number of a total of n audio devices or n PSUs in the set of PSUs). Consequently, the first operating mode can be allocated to a second audio device in a second step in the predetermined sequence. The second operating mode can then be respectively allocated to a first, third, fourth, . . . nth audio device in the second step (in the case of a number of a total of n audio devices or n PSUs in the set of PSUs). It follows that the first operating mode can be allocated to an nth audio device in an nth step in the predetermined sequence. The second operating mode can then be respectively allocated to a first, second, third, . . . (n−1)th audio device in the nth step (in the case of a number of a total of n audio devices or n PSUs in the set of PSUs).

All other audio devices may be the audio devices without the individual audio device which is in the first operating mode.

The audio device in the first operating mode may differ from the audio devices in the second operating mode. An audio device of a respective PSU can simultaneously operate only in one operating mode, for example.

An audio device can respectively transmit and receive. That is to say, an audio device can be respectively designed to transmit tone(s) in the first operating mode and to receive tone(s) in the second operating mode.

The first operating mode may be a loudspeaker mode. The loudspeaker mode may be defined by virtue of the fact that the audio device of a corresponding PSU acts as a loudspeaker if the loudspeaker mode is allocated to the corresponding audio device. The audio device in the first operating mode may be an audio device of an individual (only one) PSU in the set of PSUs. All other corresponding audio devices of the other PSUs in the set of PSUs, namely the audio devices to which the second operating mode is allocated, can act as microphones. Consequently, the second operating mode can be a microphone mode.

The emission of the test tone may be caused by a trigger signal which can initiate the emission of the test tone.

The test module may be designed to determine the check of the correct functionality on the basis of configuration information. The configuration information may contain information relating to the arrangement of the set of PSUs.

The configuration information may also contain information relating to the distance at which and/or the configuration in which different PSUs from the set of PSUs are arranged.

The test module may be designed to determine, on the basis of the configuration information, whether a PSU in the set of PSUs is arranged at its correct location according to a previously determined assignment in the aircraft.

Furthermore, a propagation time between the test tone emitted by the audio device in the first operating mode and the test tone received by a corresponding different audio device in the second operating mode can be calculated for determining whether the PSU in the set of PSUs is arranged at its correct location. The calculation can take place in the test module.

The test tone may be based on a pseudorandom signal.

As a result, ambient noise can be accordingly removed during post-processing, for example by means of averaging. Correlating the transmitted and received signals makes it possible to calculate a propagation time and, by means of the latter, a distance. Comparing the configuration information with the corresponding distances makes it possible to determine whether the corresponding audio devices or PSUs are at their correct position. If it is determined that one or more PSUs in the set of PSUs are not at the correct position, the test module can be designed to modify the configuration information. The correct configuration can therefore be taken into account.

A second aspect provides a system for functionally testing an audio device of a PSU in an aircraft. The system comprises a test module according to the first aspect. The test module may be fitted or arranged in the aircraft. The test module may also be in the form of a portable apparatus, often referred to as a handheld apparatus or handheld for short. In this case, a worker can use the handheld to be able to carry out further checks in addition to the functional test. The handheld may also be connected to the set of PSUs via a network interface. This network interface may be firm. In this case, the test module may assume a function as a network coordinator. For example, commands in the system/network can be initiated only by the test module. Better integrity can therefore be ensured and susceptibility to faults can be reduced. The system also comprises a set of PSUs in the aircraft. The PSUs in the set of PSUs may be successively provided with different operating modes, for example only the two operating modes mentioned above, in an iterative sequence. In this case, allocation of an operating mode to one PSU in the set of PSUs can also be understood as meaning allocation of the operating mode to the associated audio device and vice versa.

The test module may be fitted in the aircraft as a fixed control element. The test module can also act as a handheld apparatus which can be used by a worker for the functional check.

An aircraft having a test module described herein according to the first aspect or having a system described herein according to the second aspect is also proposed.

A third aspect provides a method for functionally testing an audio device of a passenger service unit (PSU) in an aircraft by means of a test module. The method comprises allocating, by means of a test module, a first operating mode, in which a test tone is intended to be emitted, to an individual audio device belonging to one PSU from a set of PSUs. The method also comprises allocating, by means of the test module, a second operating mode, in which the test tone is intended to be received, to audio devices which differ from the individual audio device and each belong to different PSUs from the set of PSUs. The method also comprises causing, by means of the test module, emission of the test tone via the audio device to which the first operating mode is allocated. The method also comprises initiating, by means of the test module, a functional test of the audio device, to which the first operating mode is allocated, on the basis of the test tone which is received by the audio devices to which the second operating mode is allocated.

The test module may be connected to a network. This connection may be physical or may be effected by means of a wireless connection. The network can connect all PSUs in the set of PSUs in the aircraft to one another and, for example, can combine them to form a processing and control unit. The processing and control unit may comprise two different units, a processing unit and a control unit, or may comprise both units or just perform both functionalities. For this purpose, the test module may issue or give the network corresponding commands or trigger signals, for example, in order to allocate an operating mode to the respective PSU or audio device. Furthermore, the test module may also be connected to each PSU or audio device directly or via the network as an interface, with the result that the test module can directly access the network, for example can also change the network. For example, the network may have an outsourced unit for signal processing or the test module may comprise the signal processing.

The method may also comprise carrying out the functional test and outputting a corresponding item of information via the test module in the event of a negative result of the functional test. A signal may be returned to the test module via the network interface, for example by a processing unit connected to the network. The individual tasks of signal transmission and signal processing may thus be outsourced. Furthermore, the signal processing may be carried out by a processing unit directly connected to the test module. In this case, the direct connection may be established by means of a connection existing alongside the network, for example including a wireless connection, and the necessary information relating to the quality and the function of the audio devices can thus be communicated to the test module.

The term "functional test" can also comprise a quality test of the corresponding audio devices. For example, the signal strength can be checked.

For example, the test module can act as a network control unit. The individual audio device can be understood as a master, for example in the step in which it acts as a loudspeaker. The other audio devices of the corresponding PSUs in the set of PSUs may be understood as slaves in this case. The assignment can accordingly change in the case of iterative performance, with the result that the individual audio device which is in the loudspeaker mode may be a master and the remaining audio devices of the corresponding PSUs in the set of PSUs may be slaves.

The method of operation of the individual master and slaves (audio devices) can therefore be checked according to a network protocol which can be managed by the test module. Synchronization between the master and slaves can be carried out for this purpose. The delay which results from the propagation of the test tone between the master and the individual slaves may be a propagation time which can be converted into a distance.

The propagation time measurement can be carried out since the times of transmission by the master are known to the test module and the reception times of the respective slaves can be saved or can be stored in the network. The individual transmission times may be known to the test module. Furthermore, the transmission times may be stipulated by the test module. Since the propagation in air is very much slower than propagation times of the signals via the network (network propagation times), for example through switches, etc., these network propagation times can be substantially disregarded for calculating the respective distances between the receiving devices and the transmitting device (in each step of the iteration). The correct position of the audio device can nevertheless be determined in the case of faulty cabling and this information can be concomitantly included in the configuration information, for example for the next step of the iteration. Furthermore, if the incorrect arrangement of the PSUs is determined, the configuration information can be adapted (with the aid of the newly calculated (correct) arrangement) and the iteration can be started from the beginning (again).

With the aid of the configuration information, the distance can be used to determine whether the PSUs are at the correct location in the aircraft. In this case, correct cabling of the individual modules can be ensured. The configuration information can be adapted in the case of incorrect cabling. Furthermore, the arrangement of the PSUs in the aircraft can be adapted in the network protocol. This adaptation can be directly carried out by the test module.

After determining that the configuration information or the arrangement of the PSUs is correct, it can also be determined whether the quality of the loudspeakers is substantially the same or similar. For this purpose, in two different steps with a similar constellation between the transmitter and receivers during the iterative sequence of the functional test, it is possible to determine whether two or more audio devices receive similar signal strengths. If there is a difference (for example lower signal strength), the aircraft worker can replace the audio device itself or the PSU assigned to the defective audio device.

It is clear to a person skilled in the art that the explanations stated herein may have been/can be implemented using hardware circuits, software means or a combination thereof. The software means may be related to programmed microprocessors or a general computer, an ASIC (application-specific integrated circuit) and/or DSPs (digital signal processors). For example, the processing unit, the test module, the system, the audio devices, the PSU(s), the network and the network interface may be partially implemented as a computer, a logic circuit, an FPGA (field programmable gate array), a processor (for example comprising a microprocessor, a microcontroller (μC) or a vector processor)/core (main memory, can be integrated in the processor or can be used by the processor)/CPU (central processing unit, wherein a plurality of processor cores are possible), an FPU (floating point unit), an NPU (numeric processing unit), an ALU (arithmetic logical unit), a coprocessor (additional microprocessor for supporting a main processor (CPU)), a GPGPU (general purpose computation on graphics processing unit), a parallel computer (for simultaneously performing computing operations, inter alia on a plurality of main processors and/or graphics processors) or a DSP. It is also clear to a person skilled in the art that, even though the details described herein are described with respect to a method, these details can also be implemented in a suitable apparatus, a computer processor or a memory connected to a processor, wherein the memory is provided with one or more programs which carry out the method when executed by the processor. In this case, methods such as swapping and paging can be used.

Even though some of the aspects described above have been described with respect to the method, these aspects can also apply to the test module and the system. The aspects described above with respect to the system can equally apply in a corresponding manner to the test module and the method. The aspects described above with respect to the test module may likewise apply in a corresponding manner to the system and the method.

It likewise goes without saying that the terms used in the present case are used only to describe individual embodiments and are not intended to be considered a restriction. Unless defined otherwise, all technical and scientific terms used in the present case have the meaning corresponding to the general understanding of a person skilled in the art in the field relevant to the present disclosure; they should not be interpreted too broadly or too narrowly. If technical terms are used incorrectly in the present case and therefore do not express the technical concept of the present disclosure, they should be replaced with technical terms which provide a person skilled in the art with a correct understanding. The general terms used in the present case should be interpreted on the basis of the definition in the dictionary or in a manner corresponding to the context; an excessively narrow interpretation should be avoided in this case.

In the present case, it should be understood that terms such as "comprise" or "have" etc. mean the presence of the described features, numbers, operations, actions, components, parts or the combinations thereof and do not exclude the presence or the possible addition of one or more further features, numbers, operations, actions, components, parts or the combinations thereof.

Although terms such as "first" or "second," etc., are possibly used to describe different components, these components should not be restricted to these terms. The above terms are only intended to be used to distinguish one component from the other. For example, a first component can be referred to as a second component without departing from the scope of protection of the present disclosure; a second component can likewise be referred to as a first component. The term "and/or" comprises both combinations of the plurality of objects connected to one another and each object of this plurality of the described plurality of objects.

If it is stated in the present case that a component "is connected" to another component, "is linked" to said component or "accesses" said component, this may mean that the component is directly connected to it or directly accesses it; however, it should be noted in this case that a further component may be in between. On the other hand, if it is stated that a component is "immediately connected" or is "directly connected" to another component or "directly accesses" another component, this should be understood as meaning that there are no further components in between.

The preferred embodiments of the present disclosure are described below with reference to the accompanying drawings; in this case, identical components are always provided with the same reference signs. In the description of the present disclosure, detailed explanations of known associated functions or designs are dispensed with if these unnecessarily distract from the sense of the present disclosure; however, such functions and designs are comprehensible to a person skilled in the art. The accompanying drawings of the present disclosure are used to illustrate the present disclosure and should not be interpreted as a restriction. The technical concept of the present disclosure should be interpreted such that it also comprises all such modifications, changes and variants in addition to the accompanying drawings.

Further aims, features, advantages and possible applications emerge from the following description of exemplary embodiments, which should not be understood as restrictive, with reference to the associated drawings. In this case, all of the features described and/or graphically presented show by themselves or in any desired combination the subject matter disclosed here, even independently of how they are grouped together in the claims or the way in which the claims refer back to one another. The dimensions and proportions of the components shown in the figures are not necessarily to scale here; in embodiments to be implemented, they may deviate from what is illustrated here.

DETAILED DESCRIPTION OF THE PREFERRED EMBODIMENTS

Figure 1:
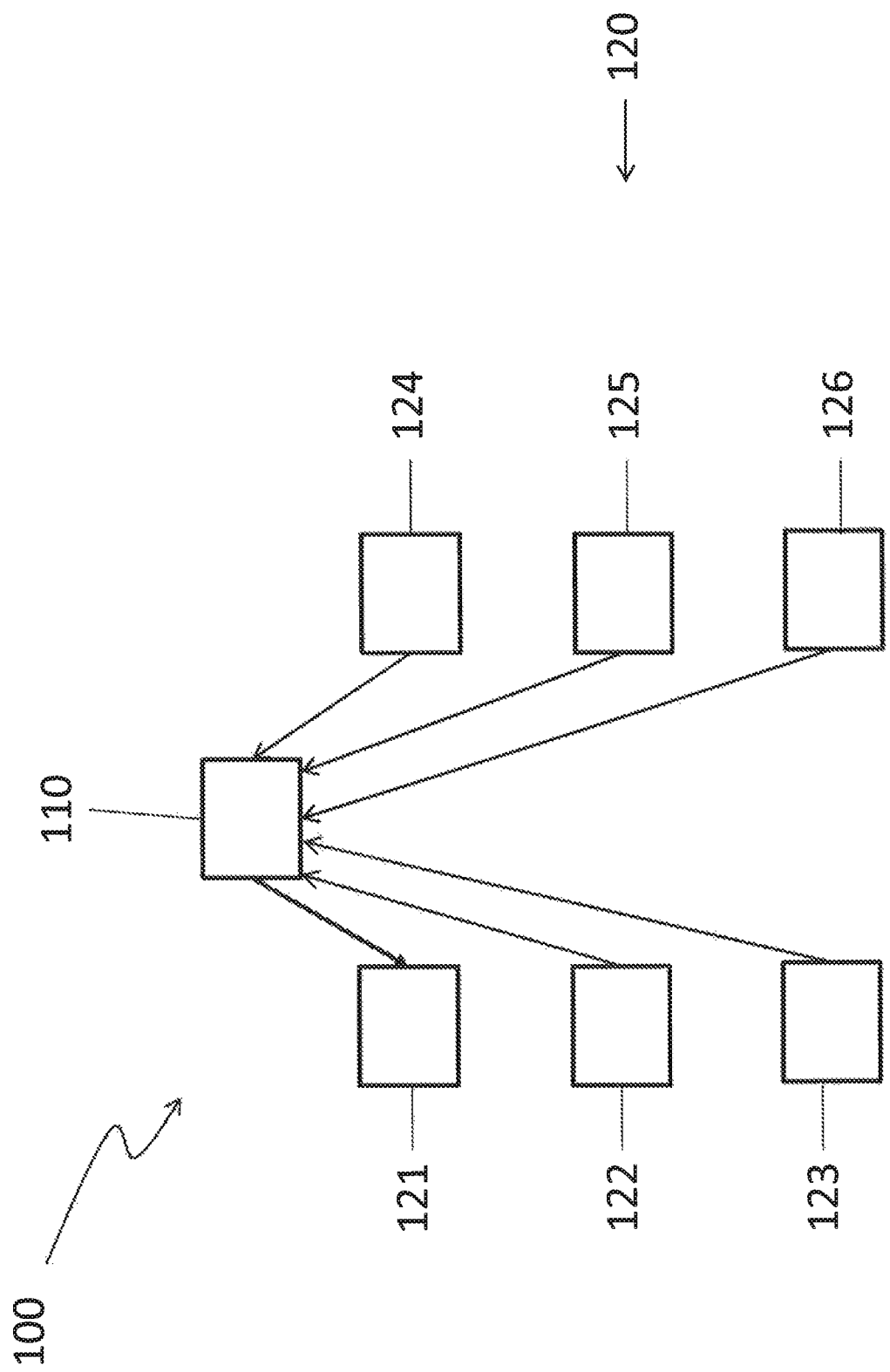
FIG. 1 shows a schematic illustration of a system comprising a test module and PSUs.

The method variants described here of the, and their, functional and operational aspects merely serve for better understanding of their structure, method of operation and properties; they do not restrict the disclosure, for instance to the exemplary embodiments. The figures are partially schematic, with essential properties and effects sometimes being shown greatly enlarged or reduced in order to illustrate the functions, operating principles, technical configurations and features. In this case, each method of operation, each principle, each technical configuration and each feature that is disclosed in the figures or in the text can be combined freely and as desired with all the claims, each feature in the text and in the other figures, other methods of operation, principles, technical configurations and features that are contained in this disclosure or emerge from it, so that all conceivable combinations can be assigned to the apparatuses described. In this case, combinations between all individual statements in the text, that is to say in each section of the description, in the claims and also combinations between various variants in the text, in the claims and in the figures are also included and can be made the subject of further claims. The claims also do not limit the disclosure, and consequently the possibilities of combining all the features shown with one another. All of the disclosed features are explicitly also disclosed individually and in combination with all other features here.

The system, test module and method are now described on the basis of exemplary embodiments.

Without being restricted thereto, specific details are set out below to provide a complete understanding of the present disclosure. However, it is clear to a person skilled in the art that the present disclosure can be used in other exemplary embodiments which may deviate from the details set out below.

While further examples are accordingly suitable for various modifications and alternative forms, some examples of the same are shown by way of example in the figures and are described in detail here. It goes without saying, however, that it is not intended to limit examples to the specific forms disclosed. Further examples may cover all modifications, equivalents and alternatives that come within the scope of the disclosure. In the entire description of the figures, the same reference signs relate to the same or similar elements, which can be implemented identically or in a modified form in comparison with one another while they provide the same or a similar functionality.

It goes without saying that, when an element is referred to as "connected" or "coupled" to another element, the elements may be connected or coupled directly or by way of one or more intermediate elements. If two elements A and B are linked by an "or", this should be understood as meaning that all possible combinations are disclosed, i.e. only A, only B and also A and B. An alternative wording for the same combinations is "at least one out of A and B". The same applies to combinations of more than two elements.

The terminology used herein aims to describe specific examples and is not intended to be restrictive for further examples. Whenever a singular form such as "a, an" and "the" is used, and the use of only one element is neither explicitly nor implicitly defined as obligatory, further examples may also comprise the plural forms to implement the same functionality. In a similar way, if a functionality is described below in such a way that it is implemented using a number of elements, further examples may implement the same functionality using a single element or a single processing entity. It also goes without saying that the terms "comprises," "comprising," "have," "contains," "containing" and/or "having" are used here to indicate the presence of specified features, whole numbers, steps, operations, elements and/or component parts, but do not rule out the presence or the addition of one or more other features, whole numbers, steps, operations, elements, component parts and/or groups of the same.

Unless defined otherwise, all of the terms used here (including technical and scientific terms) are used in their usual meaning in the field to which the examples belong.

FIG. 1 shows a schematic illustration of a system 100 comprising a test module 110 and PSUs (121, 122, 123, 124, 125, 126). The test module 110 triggers the emission of a test tone at an audio device of a PSU (changes the audio device to a loudspeaker mode) which is intended to be checked or tested. At the same time, the test module 110 changes the surrounding audio devices of the respective PSUs (122, 123, 124, 125, 126) to a microphone mode and records the audio signals received thereby. Processing of the recorded audio signals allows the correct function and quality to be checked or verified. This process can be carried out iteratively in an aircraft cabin or along a predetermined direction in the aircraft cabin of an aircraft. Each audio device can be checked as a result. The audio devices may be loudspeakers which can be configured as microphones in the microphone mode. The loudspeaker mode can be a standard configuration, for example.

A real-time network can link the audio device in the loudspeaker mode and the audio devices in the microphone mode. The network allows a recognition of the physical position of the audio source to be determined. The distance between the loudspeaker and the microphone can be determined by measuring the time between transmission and reception. In this case, the point of intersection of the distance circles around each microphone is the exact position. Using this additional information, this process can determine the integrity of the audio devices as well as the correct cabling and network addressing. If an audio device is connected to an incorrect port of the network, this port is also connected to the incorrect channel. The port can be addressed differently, for example, by comparing an expected position in a reference layout, for example in the configuration information, with the actual physical position. This can be carried out using the test module 110. If exact positioning is not required, a simpler process can relate the equipment in order to determine the arrangement sequence of the PSUs or audio devices.

A precise time protocol (PTP, IEEE 1588), for example, can be used to implement the audio localization, that is to say, the determination of the position. Furthermore, different tones can be used as the test tone in order to improve measurements on the audio devices in the reception mode. A pseudorandom signal which is robust with respect to ambient noise in the cabin can be used here, for example. Interfering noise caused by work in the cabin during the measurements or when performing the method shown in FIG. 2 can be removed hereby, for example. This tone is therefore robust with respect to ambient noise. During post-processing, this tone is advantageous when determining the correlation between the transmission and reception signals.

The audio localization can also be carried out on the basis of an intensity measurement of the emitted test tone. In this case, intensities of the test tone at the respective audio devices of the PSUs which are in the reception mode can be measured. The intensity measurements may result, in this case, from simple measurements of the signal strength of the test tone at the respective audio devices in the reception mode. These measurements can be stored in the test module or in a server which can be reached via the network. The position or location of the PSUs can be inferred from these intensity measurements. A comparison with the expected positions of the PSUs can be carried out therefrom on the basis of the configuration information. As in the example above, a port can then be correctly addressed. For example, it is possible to determine that PSUs are adjacent if two audio devices in the reception mode receive the same signal strength of the test tone emitted by the audio device in the loudspeaker mode. The accuracy of the audio localization by means of intensity measurements may be lower than by means of propagation time measurement. However, the audio localization by means of intensity measurement may be easier to implement than audio localization by means of propagation time measurement.

Further details and aspects are mentioned in conjunction with the exemplary embodiments described above or below. The exemplary embodiment shown in FIG. 1 may have one or more optional additional features corresponding to one or more aspects mentioned in conjunction with the proposed concept or exemplary embodiments described below with reference to FIG. 2.

Figure 2:
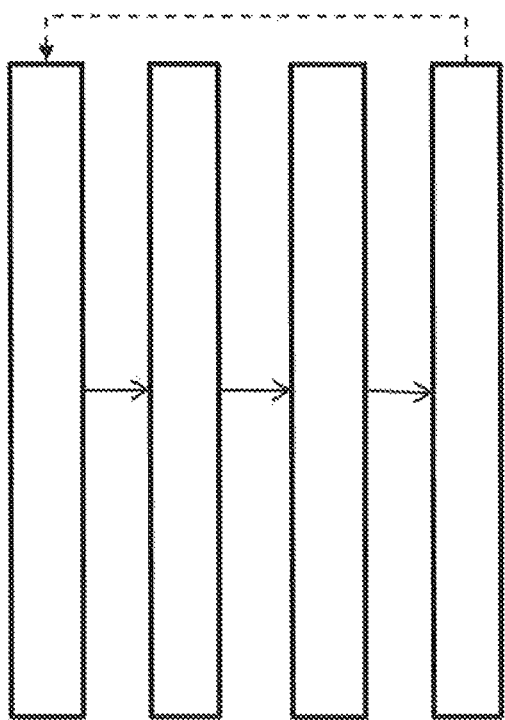
FIG. 2 shows a schematic illustration of a method for functionally testing an audio device of a PSU in an aircraft by means of a test module.

FIG. 2 shows a schematic illustration of a method for functionally testing an audio device of a PSU in an aircraft by means of a test module. In the first step S210, the test module allocates a first operating mode, in which a test tone is intended to be emitted, to an individual audio device belonging to one PSU from a set of PSUs. In the second step S220, the test module allocates a second operating mode, in which the test tone is intended to be received, to (all other/remaining) audio devices which differ from the individual audio device and each belong to different PSUs from the set of PSUs. In the third step S230, the test module sends a command to emit the test tone to the audio device to which the first operating mode is allocated. In the fourth step S240, the test module initiates the functional test of the audio device, to which the first operating mode is allocated, on the basis of the test tone received by the audio devices to which the second operating mode is allocated.

This method can be carried out iteratively for the set of audio devices or PSUs, with the result that the first operating mode has been allocated at least once to each audio device.

The method can also comprise carrying out the functional test and outputting a corresponding item of information via the test module in the event of a negative result of the functional test.

Further details and aspects are mentioned in conjunction with the exemplary embodiments described above or below. The exemplary embodiment shown in FIG. 2 may have one or more optional additional features corresponding to one or more aspects mentioned in conjunction with the proposed concept or one or more exemplary embodiments described above (for example FIG. 1) or below.

In one or more embodiments, the use of further sensors in the aircraft cabin, for example additional microphones for measurement, can be avoided. Further fault sources can be avoided by failing to introduce new sensors. Furthermore, the rate of aircraft produced per month can be increased. Furthermore, production can be optimized by reducing the workload. Furthermore, the negative influence of ambient noise in the aircraft cabin can be reduced by using adjacent loudspeakers as microphone arrays. The use of already existing sensors, namely existing audio devices/loudspeakers in the PSUs, cannot cause any additional cabling, for example. Furthermore, it may have the advantage that the quality of the check itself may be higher than with sensors in the noisy working environment of the aircraft cabin.

The aspects and features mentioned and described together with one or more of the examples and figures described in detail above can also be combined with one or more of the other examples in order to replace a similar feature of the other example or in order to additionally introduce the feature into the other example.

Examples may also be or relate to a computer program with a program code for carrying out one of the above methods when the computer program is executed on a computer or processor. Steps, operations or processes of various methods described above may be carried out by programmed computers. Examples may also cover program storage apparatuses, for example digital data storage media, which are machine-, processor- or computer-readable and code machine-executable, processor-executable or computer-executable programs of instructions. The instructions carry out some or all of the steps of the methods described above or instigate carrying them out. The program storage apparatuses may be, for example, digital stores, magnetic storage media, for example magnetic disks and magnetic tapes, hard disk drives or optically readable digital data storage media. Also, further examples are intended to cover computers, processors or control units programmed for carrying out the steps of the methods described above or (field-) programmable logic arrays ((F)PLA) or (field-) programmable gate arrays ((F)PGA) programmed for carrying out the steps of the methods described above.

The description and drawings only represent the principles of the disclosure. Furthermore, all of the examples presented here are expressly intended only to serve for teaching purposes, in order to assist the reader in understanding the principles of the disclosure and the concepts contributed by the inventor(s) for the further development of the technology. All statements made here concerning principles, aspects and examples of the disclosure, as well as particular exemplary embodiments of the same, are intended to comprise the equivalents thereof.

A block diagram may, for example, represent a detailed circuit diagram that implements the principles of the disclosure. In a similar way, a sequence diagram, flow diagram, state transition diagram, pseudocode and the like may represent various processes which are substantially represented in a computer-readable medium and thus can be executed by a computer or processor, irrespective of whether such a computer or processor is expressly represented. Methods disclosed in the description or in the claims may be implemented by an apparatus that has means for executing each of the corresponding steps of these methods.

Furthermore, it goes without saying that the disclosure of multiple steps, processes, operations, sequences or functions disclosed in the description or the claims should not be interpreted as being in the specific sequence, unless this is explicitly or implicitly stated otherwise, for example for technical reasons. The disclosure of a number of steps or functions therefore does not restrict them to a specific sequence, unless these steps or functions are not interchangeable for technical reasons. Furthermore, in some examples, a single step, a function, a process or a sequence may include a number of partial steps, functions, processes or sequences or be broken up into them. Such partial steps may be included and be part of the disclosure of this single step, unless they are expressly excluded.

Furthermore, the following claims are hereby included in the detailed description, where each claim can stand for itself as a separate example. If each claim can stand for itself as a separate example, it should be noted that—although a dependent claim in the claims can relate to one particular combination with one or more other claims—other exemplary embodiments may also include a combination of the dependent claim with the subject matter of any other dependent or independent claim. Unless it is stated that a specific combination is not intended, these combinations are proposed here. Furthermore, features of one claim are also intended to be included for any other independent claim, even if this claim is not made directly dependent on the independent claim.

The present disclosure is of course not restricted in any way to the embodiments described above. On the contrary, many possibilities for modifications thereof will be evident to an average person skilled in the art without departing from the underlying idea of the present disclosure as it is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A test module for functionally testing an audio device of a passenger service unit (PSU) in an aircraft, wherein the test module is configured:
    to allocate a first operating mode, in which a test tone is intended to be emitted, to an individual audio device belonging to one PSU from a set of PSUs;
    to allocate a second operating mode, in which the test tone is intended to be received, to audio devices which differ from the individual audio device and each belong to different PSUs from the set of PSUs;
    to cause emission of the test tone via the audio device to which the first operating mode is allocated; and
    to initiate a functional test of the audio device, to which the first operating mode is allocated, based on the test tone received by the audio devices to which the second operating mode is allocated.

2. The test module according to claim 1, wherein each PSU has only one audio device.

3. The test module according to claim 1, wherein the test module is configured, in each step in a predetermined sequence of steps:
    to allocate the first operating mode to an individual audio device belonging to a respective PSU from the set of PSUs and to simultaneously allocate the second operating mode to all other audio devices of respective other PSUs from the set of PSUs,
    to initiate emission of the test tone by the individual audio device to which the first operating mode is allocated, and
    to initiate a functional test of the individual audio device based on the test tone received by all other audio devices.

4. The test module according to claim 1, wherein the test module is configured to determine a check of a correct functionality based on configuration information, wherein the configuration information contains information relating to an arrangement of the set of PSUs.

5. The test module according to claim 4, wherein the configuration information also contains information relating to a distance at which and a configuration in which different PSUs from the set of PSUs are arranged.

6. The test module according to claim 4, wherein the test module is configured to determine, based on the configuration information, whether a PSU in the set of PSUs is arranged at its correct location according to a previously determined assignment in the aircraft.

7. The test module according to claim 1, wherein the test tone is based on a pseudorandom signal.

8. A system for functionally testing an audio device of a PSU in an aircraft, the system comprising:
    a test module according to claim 1, and
    a set of PSUs in an aircraft.

9. An aircraft having a test module according to claim 1.

10. An aircraft having a system according to claim 8.

11. A method for functionally testing an audio device of a passenger service unit, PSU, in an aircraft by means of a test module, wherein the method comprises:
    allocating, by means of a test module, a first operating mode, in which a test tone is intended to be emitted, to an individual audio device belonging to one PSU from a set of PSUs;
    allocating, by means of the test module, a second operating mode, in which the test tone is intended to be received, to audio devices which differ from the individual audio device and each belong to different PSUs from the set of PSUs;

causing, by means of the test module, emission of the test tone via the audio device to which the first operating mode is allocated; and initiating, by means of the test module, a functional test of the audio device, to which the first operating mode is allocated, based on the test tone which is received by the audio devices to which the second operating mode is allocated.

12. The method according to claim 11, wherein the method also comprises:

carrying out the functional test and outputting a corresponding item of information via the test module in an event of a negative result of the functional test.

* * * * *